(12) United States Patent
Benisty et al.

(10) Patent No.: US 7,110,641 B2
(45) Date of Patent: Sep. 19, 2006

(54) DEVICE FOR DIRECTIONAL AND WAVELENGTH-SELECTIVE OPTICAL COUPLING

(75) Inventors: Henri Benisty, Paris (FR); Ségolène Olivier, Paris (FR); Claude Weisbuch, Paris (FR)

(73) Assignees: Centre National de la Recherche Scientifique, (FR); Ecole Polytechnique, (FR)

( * ) Notice: Subject to any disclaimer, the term of this patent is extended or adjusted under 35 U.S.C. 154(b) by 0 days.

(21) Appl. No.: 11/020,688

(22) Filed: Dec. 22, 2004

(65) Prior Publication Data

US 2005/0152649 A1 Jul. 14, 2005

Related U.S. Application Data

(63) Continuation of application No. PCT/FR03/001840, filed on Jun. 17, 2003.

(30) Foreign Application Priority Data

Jun. 26, 2002 (FR) .................................. 02 07957

(51) Int. Cl.
G02B 6/26 (2006.01)
G02B 6/42 (2006.01)
G02B 6/34 (2006.01)

(52) U.S. Cl. ............................ 385/28; 385/37; 385/41; 385/50

(58) Field of Classification Search .................... None
See application file for complete search history.

(56) References Cited

U.S. PATENT DOCUMENTS

| 4,483,583 | A |   | 11/1984 | Unger .................... 350/96.15 |
| 5,526,449 | A |   | 6/1996  | Meade et al. .................. 385/14 |
| 6,130,969 | A | * | 10/2000 | Villeneuve et al. ........... 385/27 |
| 6,834,149 | B1 | * | 12/2004 | Dietz et al. .................. 385/122 |
| 2001/0026668 | A1 | * | 10/2001 | Yamada ...................... 385/125 |

OTHER PUBLICATIONS

S. Olivier et al., "*Mini-stopbands of a one-dimensional system: The channel waveguide in a two-dimensional photonic crystal,*" Physical Review B., vol. 63, 113311, pp. 1-4, © 2001.
M. Tokushima and H. Yamada, "*Photonic crystal line defect waveguide directional coupler,*" vol. 37, No. 24 (2 pages), Nov. 22, 2001.
C.J. M. Smith and R.M. De La Rue, "*Coupled guide and cavity in a two-dimensional photonic crystal,*" Applied Physics Letters, vol. 78, No. 11, Mar. 12, 2001, pp. 1487-1489. (Document XP-001015020).

\* cited by examiner

*Primary Examiner*—Michelle Connelly-Cushwa
*Assistant Examiner*—Chris H. Chu
(74) *Attorney, Agent, or Firm*—Kusner & Jaffe

(57) ABSTRACT

A device for directional and wavelength-selective optical coupling formed in a photonic crystal (12) and comprising two parallel waveguides (14, 16) separated by a coupling zone (18) enabling a particular frequency to be extracted from a signal (30) injected in fundamental mode into one of the waveguide (14) and to recover said frequency at the outlet (34) of the other waveguide (16), extraction and injection being performed by coupling between fundamental and high order modes in each waveguide.

11 Claims, 2 Drawing Sheets

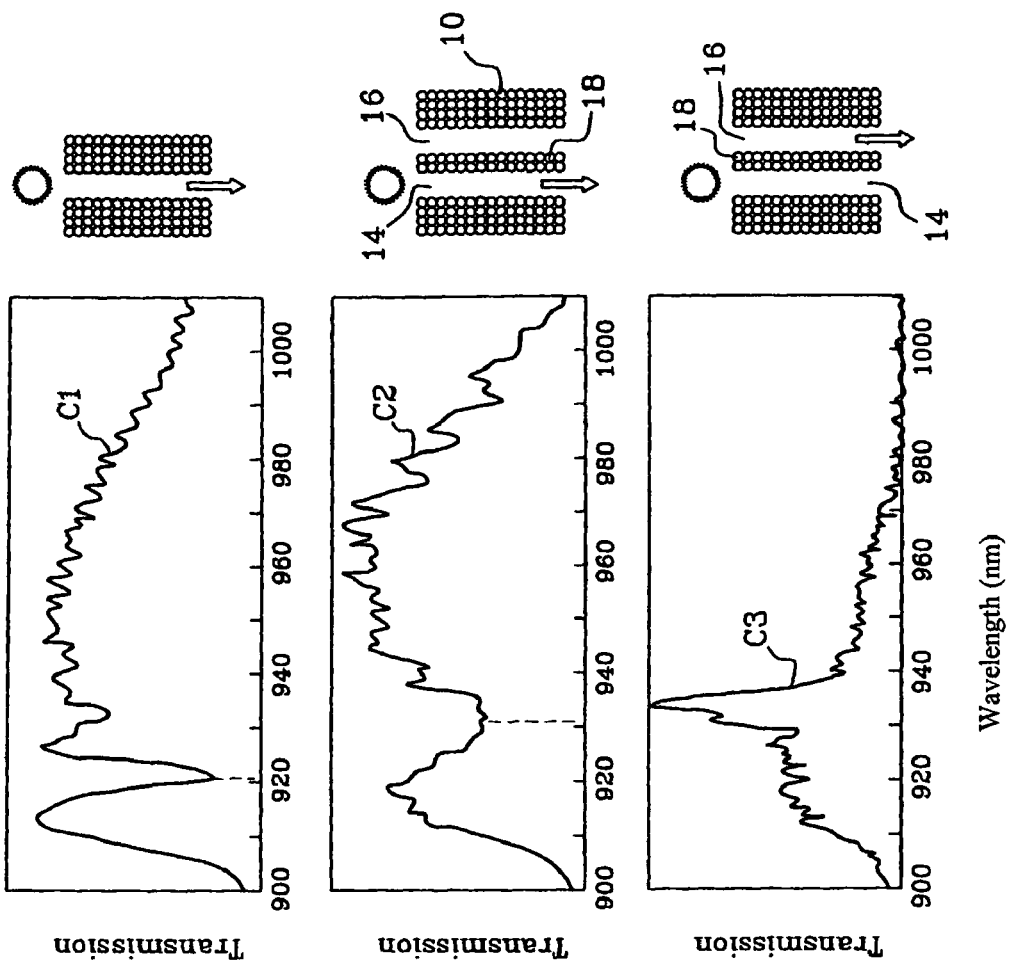

DEVICE FOR DIRECTIONAL AND WAVELENGTH-SELECTIVE OPTICAL COUPLING

This application is a continuation of co-pending International Application No. PCT/FR2003/001840 filed on June 17, 2003, and which designated the U.S.

The invention relates to a device for directional and wavelength-selective optical coupling, the coupling being implemented between two adjacent waveguides that are substantially parallel.

It is known that waveguides can be made in photonic crystals, i.e. two-dimensional components constituted by a plurality of periodically-distributed elements such as parallel columns of dielectric material or of parallel cylindrical holes in a dielectric substrate, with waveguides being formed in photonic crystals by omitting one or more rows of holes or columns.

The article entitled "Mini-stopbands of a one-dimensional system: the channel waveguide in a two-dimensional photonic crystal" by S. Olivier, M. Rattier, H. Benisty, C. Weisbuch, et al., published in Physical Review B, Vol. 63, 113311 of Mar. 2, 2001, shows that the transmission spectrum of a photonic crystal waveguide presents a narrow band of wavelengths that are not transmitted, referred to as a "mini-stopband" (MSB), which is due to coupling between the fundamental mode and a higher order mode of the waveguide.

The article "Coupled guide and cavity in a two-dimensional photonic crystal" by C. J. M. Smith, R. M. de la Rue, et al., published in Applied Physics Letters, Vol. 78, No. 11, Mar. 12, 2001, also shows that in a photonic crystal comprising a waveguide and a cavity adjacent to the waveguide, it is possible to couple energy with high efficiency through a relatively large number of rows of the photonic crystal by coupling the mode of the cavity with the higher order mode of the waveguide, said mode in turn coupling with the fundamental mode.

An object of the present invention is to use the results of the work described in those two prior documents for transferring energy in frequency-selective manner between two waveguides formed in a photonic crystal.

To this end, the invention provides a device for directional and wavelength-selective optical coupling between two waveguides, the device being characterized in that it comprises a plane component of photonic crystal structure constituted by a plurality of periodically distributed-elements, the component having two parallel waveguides separated by a coupling zone, the coupling zone being formed by parallel and adjacent rows of said periodically distributed elements and the waveguides being formed by parallel and adjacent rows lacking said periodically distributed elements or being formed by such elements having dimensions, positions, or refractive index that have been substantially modified, the longitudinal edges of the waveguides having a periodic structure serving, for determined frequencies, firstly to provide local coupling between a guided mode in one of the waveguides and a higher order mode of said waveguide, and secondly to provide coupling between said higher order mode and a higher order mode of the other waveguide through the coupling zone and coupling between the higher order mode of the other waveguide and the guided mode of said other waveguide, whereby said frequencies can be extracted from a guided signal in the first waveguide and injected into the other waveguide, said frequencies being those that are not transmitted in the first waveguide.

In a manner known to the person skilled in the art, the above-mentioned photonic crystal is a two-dimensional system without vertical structure, or a system of thin suspended membranes where light is confined vertically, or a system of the type described in the above-cited prior documents, i.e. in which a photonic crystal is etched through a monomode planar dielectric waveguide in one or other of the TE and TM optical polarizations, or in both of them.

In the device of the invention, the guided mode propagates essentially in a longitudinal direction with a group velocity and a propagation constant that are substantially of the same order as their counterparts in the dielectric substrate of the photonic crystal.

Energy transfer between the two waveguides takes place via the higher order mode of each waveguide, thus enabling the length required for the coupling zone to achieve complete transfer to be reduced considerably. For example, the coupling zone may have a length of about 500 space periods of the photonic crystal structure if the coupling takes place in fundamental mode, while the length can be reduced to ten space periods by means of the invention. In addition, because of the confinement provided by the photonic crystal, it is possible to use higher order modes that do not leak out from the two waveguides, for example modes having group velocities that are very low or propagation constants that are very small compared with their values in the dielectric substrate of the photonic crystal. In the absence of confinement by the photonic crystal, such modes would be coupled to the continuum of radiant modes of the substrate or of air. Care must then be taken to form a coupling channel having longitudinal dimensions that are as small as possible.

The guided mode of each waveguide is preferably the fundamental mode, and coupling takes place in each waveguide between the fundamental mode and a higher order mode.

In a first embodiment of the invention, the coupling zone which extends between the two waveguides has structural characteristics that are identical to those of the photonic crystal on either side of the two waveguides.

In a variant embodiment of the invention, the coupling zone between the waveguides has structural characteristics that are different from those of the photonic crystal on either side of the waveguide. For example, the size, the position, or the refractive index of the periodically distributed elements of the photonic crystal can be different in the coupling zone and in the remainder of the photonic crystal.

Furthermore, each waveguide of the coupling device is connected to an inlet waveguide and an outlet waveguide, which are of conventional type or which are formed in a photonic crystal. These inlet and outlet waveguides in which there is no coupling between the fundamental mode and a higher order mode at the frequencies under consideration are connected to the coupling waveguides by passages that are well defined, adiabatic, or abrupt.

It is generally advantageous to provide an intermediate system between the coupling waveguides in order to control coupling more finely, where the intermediate system may comprise a local modification in the dimensions, the positions, or the index of the periodic elements of the crystal as mentioned above, or a local modification of the period of the photonic crystal, or indeed a broadening or a narrowing of the waveguides in the coupling zone, or a cavity or a structural defect or a set of cavities or structural defects in the coupling zone, or an intermediate waveguide, etc.

The exact characteristics in coupling wavelength and selectivity of the operation of the coupling device of the invention are determined by the parameters of the photonic crystal (period, element size, filling factor, . . . ), by the parameters of the coupling waveguides (width), by the parameters of the coupling zone (coupling length, strength of coupling, . . . ), and by the nature of the vertically underlying substrate or dielectric waveguide. The effective index of the fundamental mode of the dielectric waveguide acts with good approximation as the index of a uniform substrate in which there are formed photonic crystal holes or columns that are of infinite vertical extent (article by D. Labilloy et al. published in Physical Review Letters, Vol. 79, No. 21, Nov. 24, 1997).

The invention will be better understood and other characteristics, details, and advantages thereof will appear more clearly on reading the following description made by way of example with reference to the accompanying drawings, in which:

FIG. 5 shows the spectrum of the signal transmitted by a waveguide formed in a photonic crystal;

FIG. 6 shows the spectrum of the signal transmitted by a waveguide of a coupling device of the invention; and FIG. 7 shows the spectrum of the energy coupled into the adjacent waveguide.

Figure 1:
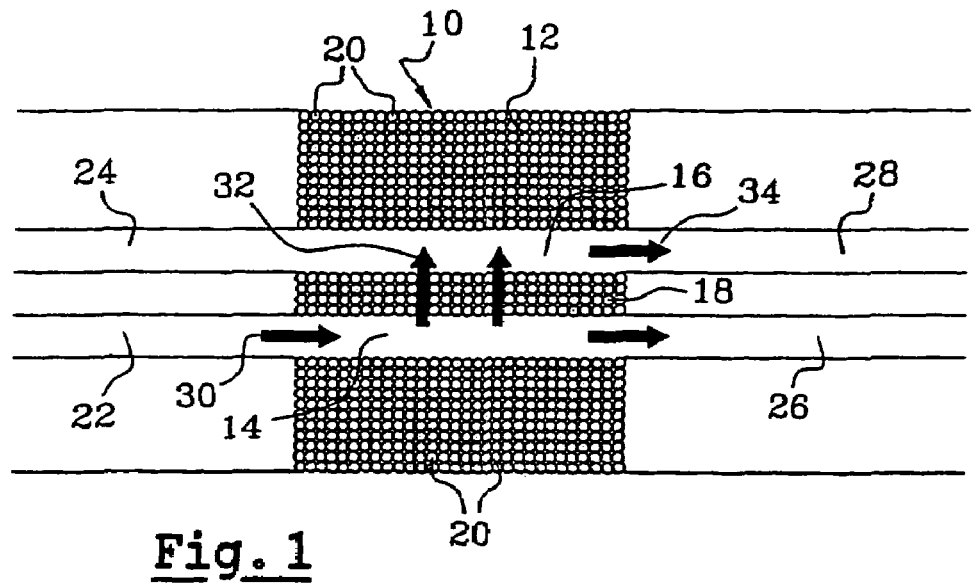
FIG. 1 is a diagrammatic plan view of a coupling device of the invention.

Reference is made initially to FIG. 1 which is a diagrammatic view of a first embodiment of an optical coupling device of the invention essentially comprising a plane component 10 of two-dimensional photonic crystal structure 12 having two parallel waveguides 14 and 16 separated by a photonic crystal coupling zone 18 which extends between said two waveguides.

In a manner known to the person skilled in the art, the photonic crystal 12 is a two-dimensional set of parallel columns 14 of dielectric material or of parallel holes in a dielectric component, the columns and the holes being perpendicular to the plane of the figure, which is the plane of the photonic crystal. The periodicity of the photonic crystal structure is comparable to the wavelength of the electromagnetic waves whose propagation is to be prevented.

In a preferred embodiment, the component 10 comprises a vertical waveguide having the photonic crystal formed therein. Each of the waveguides 14 and 16 is formed by a few missing rows of elements 20 of the photonic crystal, or by a few rows of such elements having dimensions, positions, and/or refractive index that have been greatly changed, and the coupling zone 18 between the two waveguides is formed by a few rows of said elements 20.

As a result, the edges of each waveguide 14, 16 have a periodic structure with the same period, and the widths of the two waveguides may be identical or different.

Each waveguide 14, 16 of the component 10 is connected to a respective inlet waveguide 22, 24 and to a respective outlet waveguide 26, 28, these inlet and outlet waveguides being either of conventional index contrast type, or else of the same type as the waveguides 14, 16 of the coupling device, i.e. waveguides made in a photonic crystal.

If they are made in a photonic crystal, then the characteristics of the photonic crystal forming the inlet and outlet waveguides 22, 24, 26, and 28 differ slightly from those of the photonic crystal 12 having the coupling waveguides 14, 16 so that the coupling made use of between them at the frequencies under consideration does not arise in the inlet and outlet waveguides.

In this device, when an incident light beam represented by an arrow 30 is guided along the first waveguide 14 in fundamental mode, it propagates without disturbance from one end to the other of said waveguides so as to pass into the outlet waveguide 26, except at certain frequencies where the fundamental mode is coupled to a higher order mode of the waveguide 14. This higher order mode passes through the coupling zone 18 as presented diagrammatically by arrows 32, and reaches the waveguide 16 where it couples in natural and optimum manner with the higher order mode of said other guide, from which it is coupled back into the fundamental mode propagating in the direction shown by arrows 34 so as to pass into the outlet waveguide 28.

The second waveguide 16 of the coupling device is the seat of a reciprocal mode coupling phenomenon which takes place in the first waveguide 14 at the wavelengths of the MSB that are not transmitted.

The device of the invention as shown in FIG. 1 thus enables energy to be transferred from the fundamental mode of one waveguide to the other via the higher order mode of each waveguide at the wavelengths of the MSB, which makes it possible to reduce the coupling length needed between the two waveguides for complete transfer of energy to be reduced considerably. For example, this coupling length is about ten space periods of the photonic crystal when coupling using high order modes, whereas it would be about 50 times longer if the coupling took place between the fundamental modes of the two waveguides.

In addition, the photonic crystal waveguides enable the higher order modes to be confined in the two waveguides and ensures excellent coupling efficiency from one waveguide to the other, compared with the fundamental mode. In particular, it is possible to use modes having group velocities and propagation constants that are very small compared with the corresponding values in the dielectric substrate, which are very confined in the photonic crystal waveguides, whereas leakage of these modes would be observed in waveguides of a conventional index-contrast type.

The connections between the coupling component 10 of photonic crystal structure and the inlet and outlet waveguides must be well defined so that no coupling exists between the fundamental mode and high order mode in the inlet and outlet waveguides.

In particular, for coupling purposes, it is possible to use a photonic crystal 12 having a spatial period and a filling factor that are different from those of the photonic crystals in which the inlet and outlet waveguides 22, 24, 26, and 28 are formed.

As described in greater detail below, it is also possible to modify certain characteristics of the coupling zone 18 compared with the corresponding characteristics of the photonic crystal 12 that is to be found on the other sides of the waveguides in the coupling zone in order to control the coupling more finely by adding an intermediate system. For example, an intermediate waveguide could be provided defined by missing rows of periodic elements 20 of the photonic crystal located between the above-mentioned waveguides 14 and 16.

The structure of the coupling zone 18 also makes it possible to determine the directionality of coupling devices of the invention.

When the coupling zone 18 has a spatial period that is substantially equal to that of the surrounding photonic crystal 12, coupling is codirectional, i.e. the light signal leaving the second waveguide 16 is travelling in the same direction as the light signal entering the first waveguide 14.

When the coupling zone 18 has a single structural defect that is quite localized, for example a cavity, then coupling can be bidirectional, i.e. the light fluxes leaving the second waveguide 16 are travelling in the direction of arrow 34 and in the opposite direction. When the coupling zone 18 comprises a plurality of cavities at a spacing that is a multiple of the fundamental period of the crystal, then the selectivity and the efficiency of coupling are increased.

When the coupling zone 18 is of a structure that is uniform or periodic, the coupling length of the device is equal to the sum of the characteristic conversion length between the fundamental mode and the higher order mode of each waveguide Lmsb and of the characteristic transfer length from a higher order mode of one of the waveguides to the higher order mode of the other waveguide Lc, i.e.

$$L = Lmsb + Lc = a\frac{4}{(n_a + n_b)\Delta u_{msb}} + a\frac{2}{n_b \Delta u_c}$$

where:
- a is the spatial period of the periodic elements of the crystal;
- $n_a$ is the group index of the fundamental mode:
- $n_b$ is the group index of the higher order mode;
- $\Delta u_{msb}$ the normalized frequency difference between the edges of the msb; and
- $\Delta u_c$ is the normalized frequency difference associated with coupling the higher order mode of one waveguide with that of the other waveguide.

In this formula, Lc is usually very small, and in practice it is it the coupling length Lmsb that determines the coupling length of the device of the invention.

Figure 2:
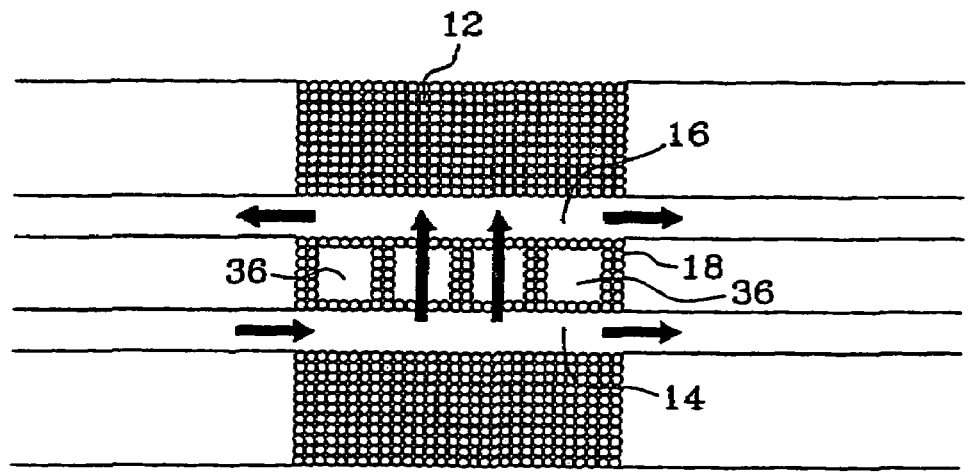
FIG. 2 is a diagrammatic plan view of a variant embodiment of the device.
Figure 3:
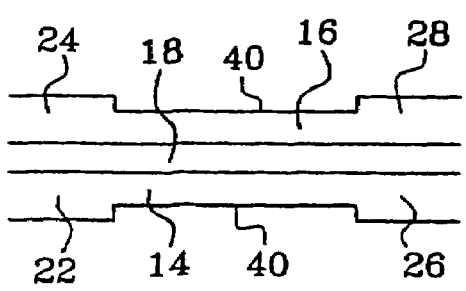
FIGS. 3 and 4 are diagrams showing other variant embodiments of the device.
Figure 4:
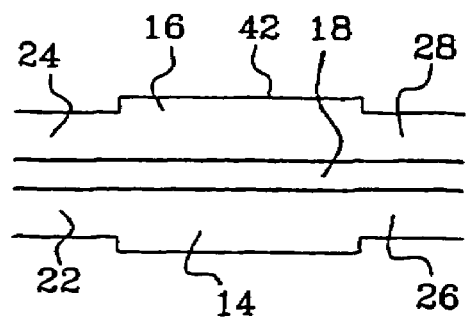

As shown very diagrammatically in FIGS. 3 and 4, the coupling zone may be defined by a narrowing of the waveguides 14 and 16 of the device (FIG. 3) located between the inlet waveguides 22, 24 and the outlet waveguides 26, 28, or by a broadening 42 of said waveguides 14, 16 (FIG. 4). The coupling zone 18 between the waveguides 14, 16 of the component 10 may differ from the remainder of the photonic crystal of said component by the spatial period of the periodic elements of the crystal, by the filling factor, by the size, or by the refractive index of the periodic elements, by the presence of a set of structural defects or cavities of periodic distribution as shown in FIG. 2, or indeed by the presence of an intermediate waveguide formed by missing or substantially modified rows of periodic elements. These means serve in particular to improve the wavelength selectivity of the coupling.

In a particular embodiment, the component 10 is a photonic crystal having a triangular pattern defined on a substrate of GaAs or of InP, or indeed of the silicon-on-insulator (SOI) type, said substrate being vertically structured (by stacking layers) to form a waveguide that is substantially monomode for the frequency and the polarization under consideration of the incident light signal. The mode of the waveguide has an effective index that typically lies in the range 2.5 to 4. The photonic crystal has a filling factor f of about 30% to 45%. These values for the effective index and for the filling factor, and the number of rows missing from the waveguide determine the value u of the center frequency of the MSB. For a waveguide having three missing rows in a typical InP or GaAs substrate, the value of u is 0.26, and it is 0.24 for a waveguide having five missing rows.

Measurements have been performed on a component of this type comprising two photonic crystal waveguides, each formed by five missing rows of holes and separated from each other by a coupling zone comprising five rows of holes.

A measurement was made initially of transmission in an isolated waveguide by injecting light into the inlet of the waveguide in fundamental mode, as described in the above-cited article by S. Oliver et al., Physical Review B 2001, and by picking up the signal as transmitted in fundamental mode. The spectrum of the signal is plotted in FIG. 5 in arbitrary units as a function of wavelength. In that test, the injected light covers the spectral band 900 nanometers (nm) to 1050 nm, and the light picked up at the outlet from the waveguide had a spectrum as shown by curve C1, which has a transmission notch at a wavelength of 920 nm. This wavelength corresponds to fundamental mode being converted into high order mode, which light is reflected by diffraction on the edges of the waveguide. Typically, the spectral width of the MSB is 5 nm to 40 nm, depending on the width of the waveguide. The other wavelengths are transmitted normally.

Thereafter, light was injected in fundamental mode into the inlet of the waveguide 14 of the component 10 and light was picked up as transmitted to the outlets of each of the waveguides 14 and 16, with the spectrum as transmitted being represented by FIGS. 6 and 7 respectively.

It can be seen that the spectrum of the signal transmitted by the waveguide 14 presents a notch at a wavelength of about 930 nm and that the spectrum of the light picked up at the outlet from the other waveguide 16 presents a peak at that wavelength. It should also be observed that there is an offset between the wavelength of 920 nm that is not transmitted by the isolated waveguide of the FIG. 5 test and the wavelength of 930 nm where selective coupling takes place between the two waveguides 14 and 16 of the device 10 is due solely to small differences in the manufacturing parameters between the component 10 used for the measurement of FIGS. 6 and 7 and the component used for the measurement of FIG. 5.

For a device of the invention in which the two waveguides are identical and are not separated by an intermediate cavity, it has been found that the coupling wavelength L of the device and the coupling parameters Kab between a guided mode and a higher order mode of each waveguide, and Kbb between the higher order modes satisfy substantially the following relationships: Kab=0.373 Kbb, and L=9.42/Kbb.

In general, the selective coupling device of the invention is applicable to routing optical signals with frequency selection, in particular in the field of telecommunications, and to mixing signals of different frequencies, in particular in the opto-electronic domain where lightwaves are used to carry microwave frequency signals, for multifrequency laser machining, etc.

The invention claimed is:

1. A device for directional and wavelength-selective optical coupling between two waveguides, the device being characterized in that it comprises a plane component (10) of photonic crystal structure constituted by a plurality of periodically distributed elements (20), the component having two parallel waveguides (14, 16) separated by a coupling zone (18), the coupling zone being formed by parallel and adjacent rows of said periodically distributed elements (20) and the waveguides (14, 16) being formed by parallel and adjacent rows lacking said periodically distributed elements (20) or being formed by such elements having dimensions, positions, or refractive index that have been substantially modified, the longitudinal edges of the waveguides having a periodic structure serving, for determined frequencies, firstly to provide local coupling between a guided mode in one of the waveguides (14) and a higher order mode of said waveguide, and secondly to provide coupling between said higher order mode and a higher order mode of the other waveguide (16) through the coupling zone (18) and coupling between the higher order mode of the other waveguide (16) and the guided mode of said other waveguide, whereby said frequencies can be extracted from a guided signal in the first waveguide (14) and injected into the other waveguide (16), said frequencies being those that are not transmitted in the first waveguide, each waveguide (14, 16) of the component (10) being connected at its ends to an inlet waveguide (22, 24) and to an outlet waveguide (26, 28), the inlet and outlet waveguides (22, 24, 26, 28) being of photonic crystal structure and having structural characteristics different from those of said waveguides (14, 16).

2. A device according to claim 1, characterized in that the above-cited guided mode is the fundamental mode of the waveguide.

3. A device according to claim 1, characterized in that the periods of the elements (20) of the photonic crystal (12) of the component (10) differ from those of the photonic crystals comprising the inlet and outlet waveguides (22, 24, 26, 28).

4. A device according to claim 1, characterized in that the filling factor of the photonic crystal (12) comprising the waveguides (14, 16) of the component (10) is different from the filling factors of the photonic crystals comprising the inlet and outlet waveguides (22, 24, 26, 28).

5. A device according to claim 1, characterized in that the transverse width of the waveguides (14, 16) of the component (10) are different from those of the inlet and outlet waveguides (22, 24, 26, 28).

6. A device according to claim 1, characterized in that the coupling zone (18) between the waveguides (14, 16) includes at least one cavity (36) or structural defect.

7. A device according to claim 6, characterized in that the coupling zone (18) between the waveguides (14, 16) of the component (10) includes a plurality of cavities (36) or structural defects that are periodically distributed.

8. A device according to claim 1, characterized in that the dimensions of the periodic elements (20) and/or the spatial period of the elements or their refractive index in the coupling zone (18) are different from those in the remainder of the photonic crystal (12).

9. A device according to claim 1, characterized in that the component (10) comprises a dielectric planar waveguide that is substantially monomode at the above-specified frequencies.

10. A device for directional and wavelength-selective optical coupling between two waveguides, the device being characterized in that it comprises a plane component (10) of photonic crystal structure constituted by a plurality of periodically distributed elements (20), the component having two parallel waveguides (14, 16) separated by a coupling zone (18), the coupling zone being formed by parallel and adjacent rows of said periodically distributed elements (20) and the waveguides (14, 16) being formed by parallel and adjacent rows lacking said periodically distributed elements (20) or being formed by such elements having dimensions, positions, or refractive index that have been substantially modified, the longitudinal edges of the waveguides having a periodic structure serving, for determined frequencies, firstly to provide local coupling between a guided mode in one of the waveguides (14) and a higher order mode of said waveguide, and secondly to provide coupling between said higher order mode and a higher order mode of the other waveguide (16) through the coupling zone (18) and coupling between the higher order mode of the other waveguide (16) and the guided mode of said other waveguide, whereby said frequencies can be extracted from a guided signal in the first waveguide (14) and injected into the other waveguide (16), said frequencies being those that are not transmitted in the first waveguide, said device further characterized in that the coupling zone (18) between the waveguides (14, 16) of the component (10) includes an intermediate waveguide.

11. A device for directional and wavelength-selective optical coupling between two waveguides, the device being characterized in that it comprises a plane component (10) of photonic crystal structure constituted by a plurality of periodically distributed elements (20), the component having two parallel waveguides (14, 16) separated by a coupling zone (18), the coupling zone being formed by parallel and adjacent rows of said periodically distributed elements (20) and the waveguides (14, 16) being formed by parallel and adjacent rows lacking said periodically distributed elements (20) or being formed by such elements having dimensions, positions, or refractive index that have been substantially modified, the longitudinal edges of the waveguides having a periodic structure serving, for determined frequencies, firstly to provide local coupling between a guided mode in one of the waveguides (14) and a higher order mode of said waveguide, and secondly to provide coupling between said higher order mode and a higher order mode of the other waveguide (16) through the coupling zone (18) and coupling between the higher order mode of the other waveguide (16) and the guided mode of said other waveguide, whereby said frequencies can be extracted from a guided signal in the first waveguide (14) and injected into the other waveguide (16), said frequencies being those that are not transmitted in the first waveguide, said device further characterized in that, when the waveguides (14, 16) are identical, the coupling length L of the device and the coupling parameters $K_{ab}$ between the guided mode and the higher order mode of each of waveguide and $K_{bb}$ between the higher order modes satisfy substantially the following relationships: $K_{ab}=0.373 K_{bb}$, and $L=9.42/K_{bb}$.

* * * * *